US011845011B2

(12) United States Patent
Kumah et al.

(10) Patent No.: US 11,845,011 B2
(45) Date of Patent: Dec. 19, 2023

(54) INDIVIDUALIZED STREAM CUSTOMIZATIONS WITH SOCIAL NETWORKING AND INTERACTIONS

(71) Applicant: Sony Interactive Entertainment LLC, San Mateo, CA (US)

(72) Inventors: Kojo Kumah, San Mateo, CA (US); Kimberlee Smith, San Mateo, CA (US); Leslie Espy, San Mateo, CA (US); Courtney Yingling, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 54 days.

(21) Appl. No.: 17/145,173

(22) Filed: Jan. 8, 2021

(65) Prior Publication Data

US 2022/0219091 A1 Jul. 14, 2022

(51) Int. Cl.
*A63F 13/86* (2014.01)
*A63F 13/60* (2014.01)
*A63F 13/73* (2014.01)

(52) U.S. Cl.
CPC .............. *A63F 13/86* (2014.09); *A63F 13/60* (2014.09); *A63F 13/73* (2014.09)

(58) Field of Classification Search
CPC ................................ A63F 13/60; A63F 13/86
See application file for complete search history.

(56) References Cited

U.S. PATENT DOCUMENTS

| 10,471,360 | B2 | 11/2019 | Trombetta et al. |
| 2003/0038805 | A1* | 2/2003 | Wong ..................... A63F 13/86 345/473 |
| 2007/0021058 | A1 | 1/2007 | Arseneau et al. |
| 2007/0279494 | A1 | 12/2007 | Aman et al. |
| 2009/0163272 | A1* | 6/2009 | Baker ..................... A63F 13/12 463/43 |
| 2013/0029735 | A1* | 1/2013 | Hormigo Cebolla ........ H04N 21/2187 463/4 |
| 2013/0303281 | A1* | 11/2013 | Argiro .................. A63F 13/428 463/31 |
| 2014/0113718 | A1* | 4/2014 | Norman ................ A63F 13/822 463/31 |
| 2014/0274392 | A1* | 9/2014 | Beran ................... A63F 13/213 463/36 |
| 2015/0375117 | A1* | 12/2015 | Thompson ............. A63F 13/79 463/9 |
| 2017/0001111 | A1 | 1/2017 | Willette et al. |
| 2017/0111667 | A1 | 4/2017 | Shaw et al. |
| 2017/0142480 | A1 | 5/2017 | Gupta et al. |
| 2017/0359624 | A1 | 12/2017 | Englert et al. |
| 2019/0262705 | A1 | 8/2019 | Trombetta et al. |

(Continued)

*Primary Examiner* — Jay Trent Liddle
(74) *Attorney, Agent, or Firm* — Polsinelli LLP (57) ABSTRACT

The present disclosure generally relates to systems and methods for providing individual customizations of a stream for an eSports event of eSports events. The customizations including incorporating customized graphic and audio displays into a viewed stream. Additionally, viewers may be able to access a limited social network for spectators having similar interests or viewing rights. In other aspects, the eSports presentation may be linked to third-party services for enhancing spectator engagement.

12 Claims, 7 Drawing Sheets

(56) References Cited

U.S. PATENT DOCUMENTS

| | | |
|---|---|---|
| 2020/0020167 A1 | 1/2020 | Depies et al. |
| 2020/0206638 A1* | 7/2020 | Nakano .................. A63F 13/795 |
| 2021/0027119 A1* | 1/2021 | Skuin ..................... G06V 40/23 |
| 2021/0046388 A1* | 2/2021 | Schwarz ............ H04N 21/8549 |
| 2021/0093968 A1 | 4/2021 | McCoy et al. |
| 2021/0136456 A1 | 5/2021 | Srinivasan |
| 2021/0235014 A1 | 7/2021 | Ogasawara |
| 2021/0374391 A1* | 12/2021 | Jorasch .................. G06V 40/10 |
| 2022/0006813 A1* | 1/2022 | Jorasch .................... G06T 7/70 |
| 2022/0219090 A1 | 7/2022 | Smith |

\* cited by examiner

INDIVIDUALIZED STREAM CUSTOMIZATIONS WITH SOCIAL NETWORKING AND INTERACTIONS

BACKGROUND

1. Field of Disclosure

The present disclosure generally relates to digital media streams of electronic sports (eSports). In particular, the present disclosure relates to systems and methods to create and customize individually customized streams for spectators of streams of an eSports tournament while enhancing social engagement amongst spectators.

2. Description of the Related Art

Certain play of video games in a competitive environment may be referred to as electronic sports or "eSports." Like non-electronic sports, the participants or competitors compete in matches and even tournaments of several matches. Such eSports matches and tournaments take place within in-game environments not only be accessible to the players themselves, but also to non-playing spectators. In some instances, eSports tournaments may be associated with in-person events similar to live sporting events, such as tailgate parties and other activities that engage a fan base. In addition, remote spectators may be provided with a digital media stream (e.g., live or recorded) of the eSports events.

Over time, eSports has grown into a large entertainment industry with millions of spectators. Despite this growth in viewership, eSports streams generally lack engagement enhancements for dedicated fans and viewers. In particular, the distributed information and experience provided to the various spectators regarding the eSports streams pale in comparison to the experience and information that is available to viewers who attend eSports tournaments events in-person. There may be a variety of reasons that make it difficult or impossible for spectators to attend tournaments in-person, however.

There is, therefore, a need to provide a more individually customized engagement experience in a digital environment associated with distribution of eSports streams.

SUMMARY OF THE CLAIMED DISCLOSURE

The present disclosure generally relates to a method for providing individual customizations of a stream for an eSports event. In one aspect, the method includes the steps of collecting information regarding the eSports event from an event server, wherein the information includes view data and gameplay information of the eSports event and organizing the collected information, wherein at least one view of the eSports event is based on the view data and gameplay information. The method further includes the steps of storing information regarding a one or more celebratory customization where the one or more celebratory customization includes one or more video game asset. Additionally, the method may include the steps of associating the one or more celebratory customization with a stored user profile, generating the stream for a spectator device based on the collected information from the eSports event, incorporating the one or more celebratory customization into the stream and distributing the generated stream to the spectator device over a communication network.

In various aspects, the video game asset may include a graphic display, a video display, an animation, or audio data, such as a fight song. In another aspect, the celebratory customization includes data captured from a player computing device used to play a game title associated with the eSports event.

In one aspect, a system may employ the disclosed techniques to providing individual customizations of a stream for an eSports event. In various aspects, the system includes a database that stores one or more celebratory customization that may be one or more video game asset. The system may include an event server, which collects information from an eSports event, and a gaming server.

In one aspect, the gaming server organizes the collected information; wherein at least one view of the eSports event is based on the view data and gameplay information. The gaming server associates the one or more celebratory customization with a stored user profile, generates the stream for a spectator device based on the collected information from the eSports event, incorporates the one or more celebratory customization into the stream, and distributes the generated stream to the spectator device over a communication network.

In yet another aspect, a tangible, non-transitory, computer-readable media includes software with encoded instructions executable by a processor. The processor executes the instructions and is operable to store information regarding one or more celebratory customization, collect information regarding the eSports event from an event server, organize the collected information, and associate the one or more celebratory customization with a stored user profile. The processor is further instructed to generate the stream for a spectator device based on the collected information from the eSports event, incorporate the one or more celebratory customization into the stream, and distribute the generated stream to the spectator device over a communication network.

DETAILED DESCRIPTION

The present disclosure describes methods and systems for defining and individually customizing digital streams. Instead of merely distributing the same digital stream of a eSports event (e.g., match or other tournament-related event) to all remote spectators—whether as a real-time stream for live spectating or as a recorded stream for later viewing on demand—various features associated with eSports gaming network may be used to customize the display of the eSports events with a stream, for example, to promote a more immersive or otherwise engaging viewer experience. In addition, such customization techniques described herein can also be provided to typical digital media distribution of any event, including non-eSports events.

As referred to herein, an eSports event is inclusive of any type of event associated with eSports play and tournaments, including the actual competitive matches involving a number of different video game competitors and affiliated events. Depending on the parameters of the tournament, the video game(s) involved can include a wide variety of genres and game titles. Some tournaments are further associated with affiliated events, which may take place in in-person settings, as well as digital settings. Thus, spectators can attend and view live eSports events much like other typical sports (e.g., football, basketball) in designated arenas or stadiums. Spectators can also view these eSports events remotely via streams distributed to their respective computing devices for display.

Embodiments of the present invention may further incorporate and automate features to dynamically define and customize a stream to provide an immersive or otherwise engaging experience corresponding to how traditional sporting events (e.g., football) are filmed, produced, and distributed to remote viewers. Thus, a digital stream may be dynamically defined to include implementation of unique views, behind-the-scenes perspectives, etc. Furthermore, some embodiments of the present invention may include further customizing a stream to include views of particular interest to a user or group of users (e.g., based on various viewer preferences, actions, and other data).

According to various aspects, the disclosed systems and methods are used to create and customize varied tiers of viewing rights for viewing one or more streams available in association with an eSports tournament or event. The systems and methods may also be stored or encoded on non-transitory computer-readable storage medium.

As used herein, a "broadcast," "presentation," "data display," "event stream." or "data stream" may be used interchangeably to refer to the eSports presentation made available to spectators. An eSports match, for example, may further include a number of different streams, as well as different views or perspectives within a stream. As such, spectators have the option to obtain greater access to an increasing number of view streams, content, views, or perspectives within an eSports tournament. Such levels of access may be associated with and obtained by purchasing tickets or subscriptions to discrete ticket tiers. By way of example, tickets or subscriptions to eSports streams may permit different viewing rights at different tiers within a hierarchy of tiers, such as "Basic," "Front row," "All Access," or "Backstage" among others. Other ways to define the different viewing rights may also be provided, including those based on curation, production, commentary, and other features.

According to one aspect, at certain ticket tiers may provide ticket holders with the ability to select a desired view stream among a plurality of view streams offered by the stream producer. Additionally, select viewers or spectators may be able to create or curate various viewing angles/perspectives for an eSports stream. As used herein, a "view" refers to a particular perspective, camera angle, camera location, or presentation of game-related data, including replays. As such, a live eSports event may be produced with a multitude of views, which may or may not correspond to the first-person or other associated views of the players. Thus, the available view may include, but are not limited to a player's view of the game, player close-up views, a team view, a wide-angle view of the competition, as well as digital or graphical presentations. Thus, the number and types of views available to spectators may vary between the ticket tiers.

In another aspect, the disclosed systems and methods are configured to curate the available views according to viewer ratings. The ratings may be based upon viewer inputs, the spectator's physical movement and facial expressions while viewing, the type of game being played, and in game actions analyzed in real time. For example, as an active player becomes inactive or one player/team gains momentum in the game, particular game views may be automatically displayed or highlighted for selection. In another aspect, the display or highlighting or a particular view may be based upon predicted player actions, player tendencies, or in-game situations or scenarios.

Figure 1:
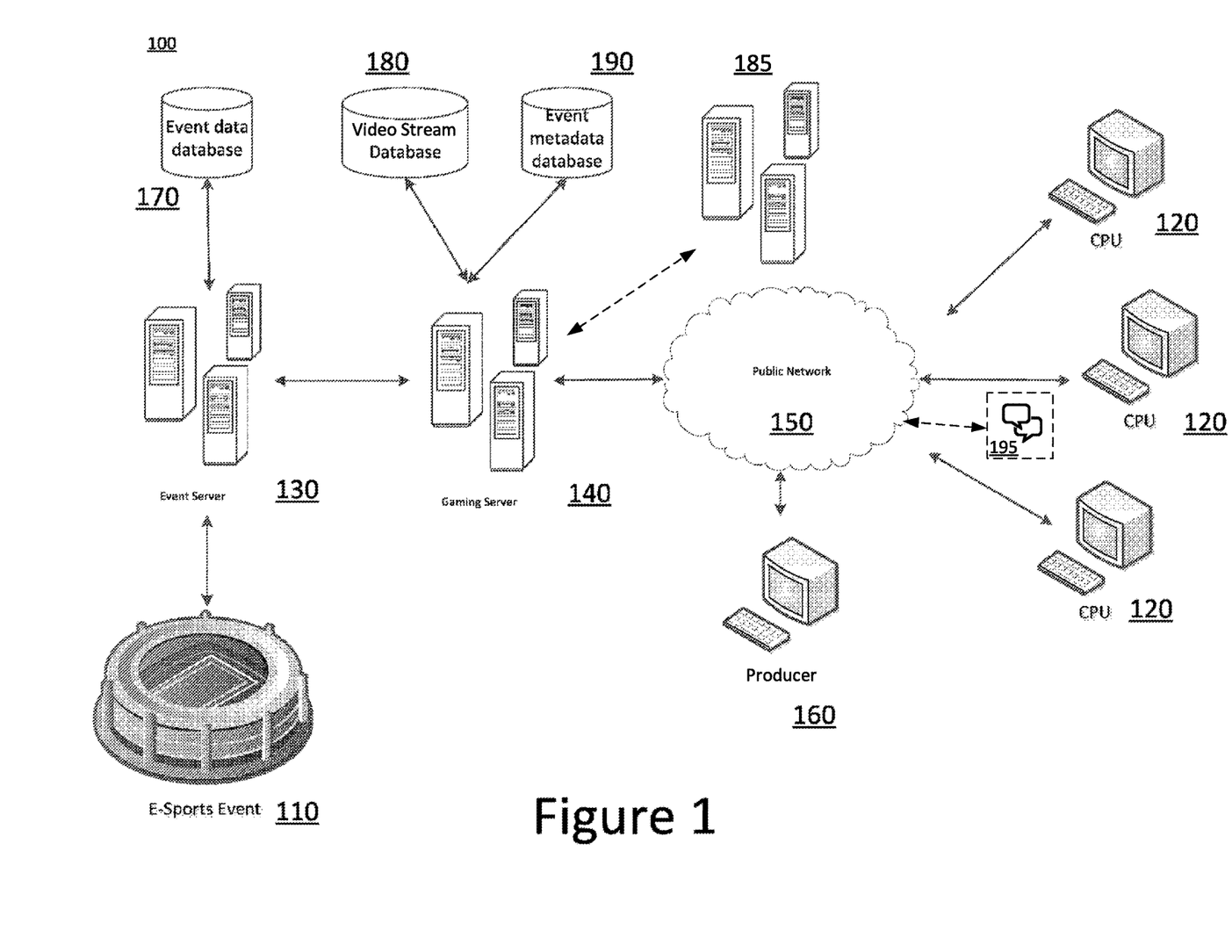
FIG. 1 illustrates an exemplary network environment in which a system for dynamically defining and customizing digital streams may be implemented.

A system 100 for providing individually customized engagement and views in an eSports event is illustrated in FIG. 1. The individually customized engagement and views can be implemented via a tier-based system where viewers may purchase or subscribe to different tiers or levels of customization. The system 100 would also facilitate of the creation or generation of spectator-defined views available to one or more spectators viewing the eSports events on their respective user computing devices 120.

As illustrated, the system 100 provides distribution of eSports event data from an eSports event 110 to various remote users on their respective computing devices 120. The distribution may include, for example, live streams from which remote viewers may view on their respective computing devices 120. The eSports event data from the eSports event 110 may be collected and processed at event server 130. The eSports event data from the eSports event 110 is then transmitted to the gaming server 140 that performs the modifications to the eSports event data. Described in further detail below, the modifications to the eSports event data at the gaming server 140 may include generating new, customized, and/or composite data streams in real time or near real time using the eSports event data. Furthermore, the gaming server 140 may provide different groupings of data streams to remote viewers based upon designated ticket tiers. For example, a "Basic" tier package may provide access only a limited set of streams (or views) and options for modifying the same. For example, the "Basic" set of streams may be limited to a single stream or an official broadcast as provided and directed by the producers. Conversely, ticket holders in the "All Access" tier have access to and the ability to select from all of the view streams generated during the eSports event. Such selection may be based on real-time switching options, predetermined preferences, or a combination. In some embodiments, certain in-game events of significance (e.g., record-breaking plays) may be predicted and used to notify spectators, as well as used as a basis for switching views.

For example, the gaming server 140 can provide various perspectives of the eSports event data from different in-game points of view (e.g., different player perspective, different camera perspectives) based upon one or more data streams generated by a producer of the eSports event. The producer may consist of at least one of an event producer, director, broadcaster/distributor of the event, a developer, commentator, or other individual that applies one or more modifications to the stream. The gaming server 140 may further segment those data streams based upon ticket tiers offered to the remote viewers.

The gaming server 140 can also provide different views for the eSports event based on different characterizations.

For example, a remote viewer may request the same view as a particular player on a team. Another view may be the view of a coach who may be responsible of overseeing multiple players simultaneously. Alternative views could be the view from within the venue of the live eSports event. For example, a spectator could be provided a view of the eSports event corresponding to a real-world venue location as if the remote viewer is actually attending the live event. This would allow remote viewers to customize their viewing display further for a more immersive experience.

In this example, viewers that purchase or subscribe to the lowest ticket tier may be presented with a standard viewing stream where the various views and perspectives shown are selected and changed by a director of the eSports event, similar to a traditional television broadcast. In a higher ticket tier, the viewers may be offered an expanded number of views over the lower ticket tiers. Furthermore, the viewers may be able select and change their viewing perspective at will. In even higher ticket tiers, viewers have access to even more data streams including audio and other digital or graphic displays and may even the ability to generate a unique customized data stream by creating a composite of two or more existing data streams. Alternatively, the viewers at higher ticket tiers may have the ability to generate new data streams not produced by the producer, such that these viewers can create their own unique customized experience using data from the gaming server 140.

After any numbers of modifications have been performed by the gaming server 140, the eSports event data can then be provided to the public network 150 where users on their computing devices 120 can receive and view the eSports event display. Exemplary computing devices 120 may include laptops, desktops, mobile devices, and tablets. The users may be able to download the eSports event data directly to their computing devices 120 using various software applications installed on the computing devices 120. In other situations, web-based applications or streaming services may provide user access to and viewing of the eSports event data. Users may then be able to view the eSports event data as a video stream inclusive of all the modifications such as statistics, commentators, crowd interactions, and advertisement added by the gaming server 140.

The event server 130 obtains eSports data from an eSports event 110. The eSports event 110 can be a video game competition held at a predetermined location such as an arena or stadium. The eSports event data obtained from the eSports event 110 would include videography and gameplay information associated with each of the video game competitors participating within the eSports event 110.

As an example, if the eSports event 110 were a tournament playing a head-to-head video game based on American football, baseball, or soccer, the eSports event data would be the gameplay data associated with each of the players during each game. The gameplay data being obtained from the eSports event 110 may include video gameplay information associated with each player's individual interactions with respect to the videogame such as each player's point of view as they play the game and game state within the video game at any given moment in time. The gameplay data may also include different player's inputs (e.g., keyboard and mouse inputs) and communications (e.g., voice and text chat) between teammates or opponents during the course of the match as well. The event server 130, in the process of obtaining gameplay data for each player, can also obtain video recordings of each player during the course of the match. The video recordings may be recordings of each player's screen as the video game match is occurring. The video recording may also be an in-game perspective of the video game match using features (e.g., spectator camera perspectives) associated with the video game. This video data can be provided to the gaming server 140 to be used in the distribution of the eSports event (or used to supplement rendered gameplay video from the gaming server 140) sent to the users on their computing devices 120.

The event server 130 may also be capable of obtaining additional information related to the video game being played during the eSports event 110. For example, microphones, cameras, and/or sensors may be used to capture information about the audience attending the live eSports event 110. Furthermore, any audio and video related to on-site commentators can also be captured by the event server 130. Additionally, the gameplay data captured by the event server 130 may also include additional points of view that could be available or otherwise generated during the game, even those not selected by the player. For example, if Player A prefers to play using a third-person point of view, the game data for various first person points of view may also be received at the event server 130. These alternate points of view, including other first person points of views or third person points of views, among others, ordinarily generated by the game, may be captured by the event server 130 for subsequent distribution, manipulation, or storage by the gaming server 140.

The event server 130 can store the information obtained from the eSports event data in an event data database 170. The event data database 170 may be used to store the video data as well as any gameplay information retrieved from the event server 130. The information stored within the event data database 170 can be accessed by the gaming server 140 as needed, for example, to generate various views available to ticket purchasers or subscribers available in one or more eSports event stream.

The gaming sever 140 generates the eSports event data that will be distributed to users on their computing devices 120. The distribution of eSports event data may generally include a video recording of the eSports event 110 along with additional information and commentary aimed at immersing the user when viewing the eSports event. The video recording may be obtained directly from the eSports event 110 via the event server 130. It may also be possible for the gaming server 140 to re-render game states of the video game using the extract gameplay data from the event server 130. For this situation, the gaming server 140 may retrieve stored video game assets associated with the video game of the eSports event 110. By using the extracted gameplay data and the stored video game assets, the gaming server 140 may be able to re-create or generate customized video of the video game as if it was recorded directly via the gaming server 140.

The gaming server 140 can also provide different views of the event. The event server 130 collects all types of information from the eSports event that includes the views from different players. Furthermore, videogames may have the ability to provide different views of the environment within the game and the gaming server 140 using this feature can similarly change the view that users can view on their computing devices 120.

The gaming server 140, using the eSports event data coming from the event server 130, can then extract relevant information the eSports data streams that viewers will view on their computing devices 120. The types of extracted information obtained by the gaming server 140 can be the information that viewers may find interesting.

In yet another aspect, the gaming server 140 is capable of using the collected information from the eSports event from the different players in order to reconstruct a unique view if such view is not available within the video game. This may be done by using the collected information from the event server 130 and the stored game assets available to the gaming server 140. The gaming server 140 may be able to re-render what the state of the video game at a given point in time and then focus re-rendering certain portions based on the desired focus. This allows the gaming server 140 to provide a different (and possibly comprehensive) view of the video game using all the information available in situations where only partial information may be known by each individual participant (e.g., eliminating "fog of war" effects).

In various aspects, the gaming server 140 generates or renders exclusive video or data streams that may not be produced by the eSports producer. These include user-created views The public network 150 facilitates communication of the eSports event data from the gaming server 140 with the plurality of user computing devices 120. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers include the public switched telephone network, a cable service provider, a provider of digital subscriber line (DSL) services, or a satellite service provider.

Producers 160 are also able to affect how the distribution of the eSports event data is performed. Producers 160 are able to interact with the event server 130 and gaming server 140 using their respective computing devices. For example, producers 160 may create, run, and manage the eSports event. Furthermore, modifications to how the distribution of the eSports event data are sent to the remote viewers on their computing devices 120 can also be implemented by the producers 160 such as identifying what additional video streams should be incorporated and what additional information (e.g., statistics) should be shown during the distribution of the eSports event data. The producers 160 may also select a particular video stream of the multitude of video streams available to a particular ticket tier.

The event data database 170 may be associated with the event server 130 and used to store the eSports event data obtained from the eSports event 110. The event server 130 may be capable of obtaining a variety of different types of eSports event data from the eSports event 110 inclusive of video recordings, audio, and text-based information. As previously indicated, the event data database 170 may store additional video stream views or perspectives of the game not selected by the players.

The eSports event data obtained from the eSports event 110 can be subsequently stored in the event data database 170. In some situations, the information stored in the event data database 170 can be accessed at a future time and date for viewing a previously eSports event on-demand after the live event has been completed. Although the event server 130 can directly transmit the eSports event data obtained from the eSports event 110, it may also be possible that the gaming server 140 access the event data database 170 for some or all the information that will be distributed to the users.

The video stream database 180 is used to store a plurality of different video streams, including viewer created views, and/or ticket tier exclusive video streams that may be included into the data streams of the eSports event data being provided to the various users, by the gaming server 140. In various aspects, the contents of the video stream database are provided to the viewers based upon their ticket tier.

The event metadata database 190 is used to store the metadata associated with the eSports event streams being provided to the user computing devices 120. The gaming server 140 can generate the metadata to indicate what additional information or views can be incorporated with an event data stream for a particular viewer. The metadata is associated with the streams so that additional views available or the option to generate a customized view can be provided to appropriate views. In one aspect, the gaming server 140 may generate ticket tier metadata that includes information regarding the types and quantity of video streams that can be incorporated into the streams based on the eSports event being streamed and the ticket tier/subscription of the user viewing the stream. For example, metadata may be used to link an "All-access" ticket purchaser to all available data streams captured by the event server 130 as well as all those generated or re-rendered by the gaming server 140. The metadata can similarly be used to link viewer reactions or other inputs at the viewer computing devices 120 to the selection or automatic display of certain video streams through machine learning.

Each metadata generated by the gaming server 140 may be assigned a unique identification that is linked with eSports event data used in a stream, a particular ticket tier, and/or a unique user identification. Because the metadata is uniquely identified to be associated with event data, ticket tiers, and/or a unique user and is used to indicate where and when the additional information is incorporated into the event data stream, it is not necessary for the gaming server 140 to store multiple entire event presentations including the additional information obtained from the eSports event 110 or multiple instances of the same user-created views. Instead, whenever eSports event data is used in a stream, the corresponding metadata associated with the eSports various view streams can be retrieved from the event metadata database 190 via the gaming server 140 querying the event metadata database for any relevant metadata.

Figure 2:
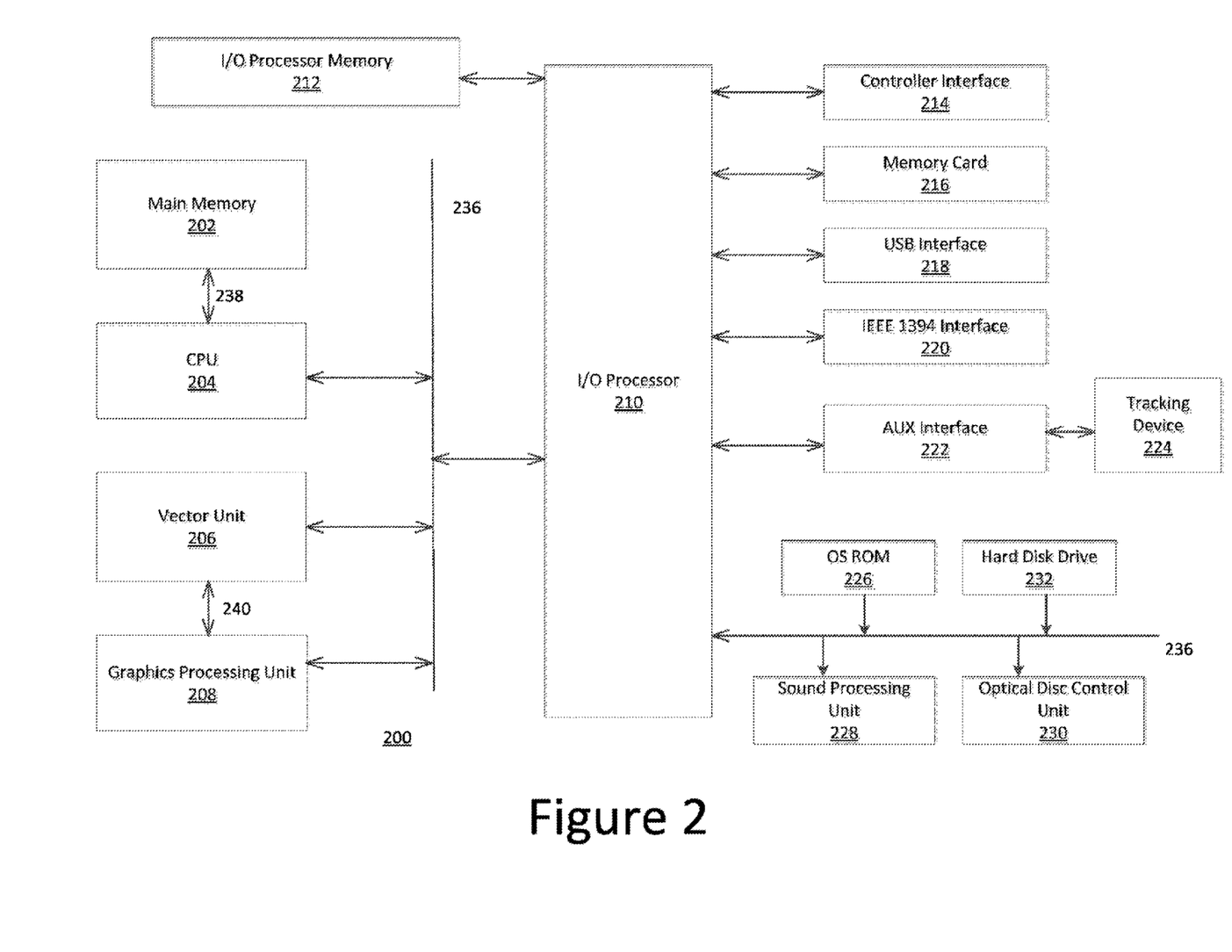
FIG. 2 is an exemplary user device that may be used in context of the system of FIG. 1.

FIG. 2 is an exemplary user device 200 that may be used in context of the system of FIG. 1. The user computing device 200 may correspond to user computing device 120 of FIG. 1 and may be inclusive of desktop, laptop, tablet, mobile device, console gaming system, etc. The user computing device 200 is a device that the user can utilize to facilitate carrying out features of the present disclosure pertaining to the individually customized engagement and views for the eSports event. In particular, the user computing device 200 allows the user to view the distribution of eSports event data remotely. The user computing device 200 would facilitate the user viewing of the eSports event data via a display associated with the user computing device 200.

The user computing device 200 may include various elements as illustrated in FIG. 2. It should be noted that the elements are exemplary and that other aspects may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE interface 220, an auxiliary (AUX) interface 222 for connecting a tracking device 224, although other bus standards and interfaces may be utilized. The user computing device 200 further includes an operating system read-only memory (OS ROM) 226, a sound processing unit 228, an optical disc control unit 230, and a hard disc drive 232, which are connected via a bus 234 to the I/O processor 210. The user computing device 200 further includes at least one tracking device 224.

The tracking device 224 may be a camera, which includes eye-tracking capabilities. The camera may be integrated into or attached as a peripheral device to user computing device 200. According to various aspects, typical eye-tracking devices may use infrared non-collimated light reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer may be needed before using the eye tracker.

In other aspects, trackers that are more sensitive may use reflections from the front of the cornea and that back of the lens of the eye as features to track over time. In yet other aspects, even more sensitive trackers image features from inside the eye, including retinal blood vessels, and follow these features as the eye rotates. Most eye tracking devices may use a sampling rate of at least 30 Hz, although 50/60 Hz is most common. Some tracking devises may run as high as 240 Hz, which is needed to capture detail of very rapid eye movement. The foregoing describes example eye-tracking technology that may be used in accordance with the present disclosure. In various aspects, any known eye gaze tracking technology that one skilled in the art would be capable of applying could be used.

A range camera may instead be used with the present disclosure to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve, and display content on the user computing device 200.

Alternatively, tracking device 224 may be the controller of the user device 200. The controller may use a combination of built-in accelerometers and infrared detection to sense its position in 3D space when pointed at the LEDs in a sensor nearby, attached to, or integrated into the console of the entertainment system. This design allows users to control functionalities of the user computing device 200 with physical gestures as well as button-presses. The controller connects to the user computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement. Further still, in various aspects, any technology suitable for measuring and/or capturing motion, facial expressions and/or any other physical or physiological state of a user may be used.

As noted above, the user computing device 200 may be an electronic gaming console. Alternatively, the user computing device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 230. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

A user of the user computing device 200 provides instructions via the controller interface 214 to the CPU 204. For example, the user may instruct the CPU 204 to store certain information on the memory card 216 or instruct the user device 200 to perform some specified action. Example controllers associated with the controller interface 214 may include a touch-screen, keyboards, and game controllers.

Other devices may be connected to the user computing device 200 via the USB interface 218, the IEEE interface 220, and the AUX interface 222. Specifically, a tracking device 224, including a camera or a sensor may be connected to the user computing device 200 via the AUX interface 222, while a controller may be connected via the USB interface 218. In some aspects, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
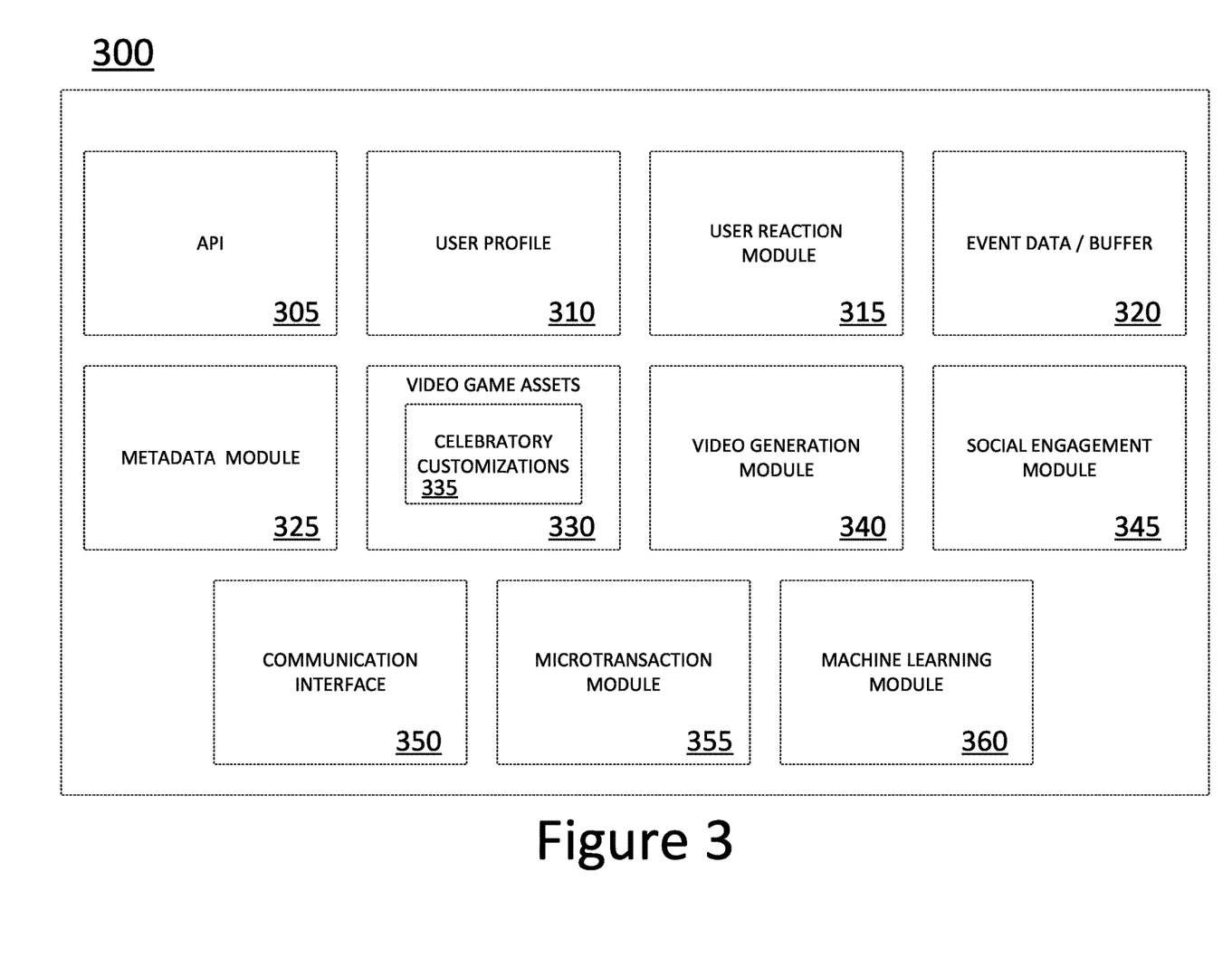
FIG. 3 is a block diagram of an exemplary gaming server that may be used in context of the system of FIG. 1.

FIG. 3 is a block diagram of an exemplary gaming server 300 that may be used in context of the system of FIG. 1. The gaming server 300 may corresponding to gaming server 140 of FIG. 1 and includes a plurality of different features that facilitates the individually customized engagement and views in an eSports event. As illustrated in FIG. 3, the gaming server 300 may include an application program interface (API) 305, user profiles 310, a user reaction module 315, eSports event data storage and buffer 320, metadata module 325, storage for video game assets 330, a view generation module 340, a social engagement module 345, communication interfaces 350, a microtransaction module 355, a machine learning module 360. Details regarding each of these features will be provided below in further detail.

The application program interface (API) 305 allows an entity to manage how eSports event data is distributed to remote viewers. Using the API 305, an administrator (e.g., developer, tournament organizer) can customize and modify how the gaming server operates with respect to what data is retrieved from the event server, what data is processed and generated from the event server, and how the eSports event data is distributed to the remote viewers. For example, the administrator (through the use of the API 305 can create and/or modify the information associated with the various user profiles 310 and user reaction profiles 315 that indicate the types of additional or substitute content that will be implemented into the distribution of the eSports event data to the remote viewers.

Furthermore, any updates needed with respect to the features associated with the gaming server can be implemented using the API 305 as well. For example, various video games may obtain patches and or other fixes during the course of an eSports event or between eSports events. The API 305 can be used to modify the video game assets 330 to incorporate those patches and other fixes as well.

The user profile 310 is used to store information about each remote viewer. Remote viewers may need to create their own profile and sign in to their respective profiles before being allowed to access/view eSports event data. The user profiles 310 would be used by the gaming server 300 to identify the types of modifications to the eSports event stream that can be carried out to better immerse the user in the viewing experience.

When there are different ticket tiers or viewing rights based on subscription types, the user profile 310 stores the information for each event as it relates to the remote user. As disclosed, different features or views are available to users based on their status associated with a particular ticket and/or subscription tier. For example, if viewer A purchases lower tier access, they are presented a less desirable or less detailed vantage point of the eSports event, in contrast to viewer B who purchases a higher tier access that allows a "field-level" vantage point or plurality of vantage points including those in in lower tiers. Information regarding the particular ticket tier or access level purchased by the user for a particular event will be stored in the user profile 310.

The user profile 310 may also store user preferences about the distribution of the eSports event data being remotely viewed on their user computing device. For example, the user profile 310 can customize preferred views, preferred additional information to be displayed, preferred audio, and even preferred advertisements. For example, when presented with a multitude of views or perspectives, the user profile 310 may indicate that the user prefers first person views to third person views. As such, all first person views in the event data provided to that particular user may be prioritized or presented first before other available views. The user profile 310 can be updated anytime by the respective user through their user computing device.

The user profile 310 can also store information about the user computing devices. This information can be used by the gaming server 300 to identify how the eSports event data can be processed and transmitted. This may identify, for example, the format the eSports event data would need to be transmitted in order to be compatible with the user computing device. With all the information about the user stored in the user profile 310, the gaming server 300 would be able to identify the appropriate version of the eSports event data to be distributed.

The user feedback module 315 receives and processes feedback regarding a user's reaction to the presented event data. The user feedback module 315 is used to receive information that instructs or suggests what video stream views should be shown to users and when they should be shown. The reactions may include ratings input by the user at computing device 120. The reactions may also include physical movements or facial expressions captured by the tracking device 204

As previously discussed, different views or perspectives may be incorporated into the distribution of the eSports event data based on, for example, user preference, video game genre, and a user ticket tier. As such, the user feedback module 315 may be referenced to automatically select and or at least suggest a particular event data view or perspective for presentation based upon the viewers' reaction during the presentation. By way of example and not limitation, a user input a low rating or they may continually avert their gaze from a presented perspective that is found to be uninteresting. In response, the user feedback module 315 is used to determine that the user is no longer interested or engaged to the current perspective. In response, the gaming server 140 may automatically present another perspective.

Similarly, in one aspect, the tracking device 204 may detect that a user is interested in only a portion of the presented view, such as events that may be occurring in the background or the periphery of the presented view. In response, the user feedback module 315 is used to detect the particular area of interest and the gaming server 140 may automatically present a different perspective that highlights the area of interest.

The eSports event data storage and buffer 320 is used to store eSports event data coming from the event server. The eSports event data storage and buffer 320 may be used to store the eSports data temporarily until it can be processed and used in the distribution of the eSports event data.

The metadata module 325 generates metadata for the eSports event data being distributed to the remote viewers on their computing devices. The generated metadata identifies the types of information to be incorporated into the distribution of the eSports event data as well when that information should be presented.

The metadata generated by the metadata module 325 is uniquely associated with the distribution of the eSports event data. This can be performed, for example, by providing unique labels that connect one with the other. In this way, the eSports event data used in distribution to the remote viewers can be stored separately from the metadata that is generated. However if the eSports event data is ever retrieved and viewed by the user, the corresponding metadata can be queried and applied accordingly.

Storage for video game assets 330 includes assets associated with the eSports event. The stored assets are used by the gaming server to reconstruct gameplay of the video game using the eSports event data from the event server. In addition to possibly using video-based information from players or in-game information from the event server, the gaming server would also be able to recreate gameplay using the eSports event data. This may include generating a comprehensive map of all participants.

The use of the video game assets 330 can also be used to generate different views that would not be available within the video game itself. This can be tied with the view generation module 340 where the gameplay assets would be useful in generating additional views, composites, or simulations of the in-game environment.

In various aspects, the view generation module 340 may also be used to generate user-defined or customized views. In one example, a user-defined or customized view may be a composite view of one or existing views available to their ticket tier. In another example, a user-defined view may be a new view generated at the gaming server 315 based on particular elements of the event data. For example, a user-created view may include a split screen or sub-divided view having one or more subsections. The subsections may be populated by existing perspectives or only portions thereof. As such, a user-created view may be customized to the particular viewer.

In other aspects, the view generation module 340 may also generate, capture, or otherwise provide replay views of the eSport event. The replay views may be based upon any video stream views, user-generated views, custom views, among others. The replay views may be displayed to the viewers as stand-alone views or may, in some aspects, be offered as Picture-in-Picture ("PIP") views. Furthermore, the quantity and quality of replay views available to the views may be tied to the viewing tiers.

The view generation module 340 may also use machine learning to generate or suggest particular game views based upon predicted player actions and tendencies as determined by the contemporary and historic data obtained from the event server 130 or the event data database 170. For example, the machine-learning module may generate or suggest a particular view or perspective that will include game sequences of interest to at least one viewer. These may include a particular perspective that is likely to have a clear view of a player action. Once generated the machine generated views may be assigned a unique identifier for use by the metadata module. Therefore, the machine learning generated view may be provided to users that have purchased an appropriate ticket for the eSports event.

The social engagement module 345 facilitates and encourages further engagement with the event stream and social interactions among the viewers at the user computing devices 120. In some implementations, the social engagement module 345 analyzes historical activity, preferences, and interests, of the viewers. In one aspect, the social engagement module 345 is further configured to access social media profiles, posts, and other data of the viewers. The data analyzed by the social engagement module 345 in conjunction with respective viewer data in the user profile 310 may be used to identify customized content to further increase view engagement.

In one aspect, the social engagement module 345 may determine that a viewer is a fan or supporter of a particular team or group that is associated with the eSports event stream. Under typical circumstances, the crowd noise, music played and other visual displays (including but not limited to signs, banners, animated audience members, or even celebratory displays of fireworks) are geared towards the home team. For viewers that are fans of the home team, the videogame data generated during ordinary game play is likely to provide sufficient engagement to these viewers. In contrast, actions performed by the away team may typically be accompanied by boos, jeers, or silence.

As such, the social engagement module 345 may increase viewer engagement by causing the gaming server 300 to provide or incorporate customized displays to the video streams of viewers determined to be fans of the away team. For example, the social engagement module may determine that a particular view is a fan of the visiting or away team in the video game being played. The social engagement module 345 may identify stored video game assets 330 that are applicable or appealing to fans of the away team and, in conjunction with the video generation module 340, incorporates these assets into video streams provided to particular viewers.

The stored video assets incorporated into customized video streams are referred to herein in as "celebratory customizations." In one example, the video streams available to fans or supporters of the away team may include fireworks displays or the fight song, among other away team celebratory assets. The celebratory customizations are not limited to displays for the away team nor are they limited to customizations celebrating achievements of the viewer's preferred team, but may be also refer to customizations highlighting actions detrimental to the opposition. Celebratory customizations may also include any video game asset not predetermined for display at a particular instance of game play. As such, fans of the home team may also access and select celebratory customizations that differ from the video game asset programmed for display.

In various aspects, individual celebratory customizations or groups of celebratory customizations may be purchased before the eSports event or during the event through one or more micro-transactions as later described in reference to the microtransaction module 355.

The social engagement module 345 may facilitate social interactions between the groups of viewers. For example, the social engagement module 345 generates social engagement lounges where subgroups of viewers may participate in chats or interactive video streams to viewers. In one aspect, the social engagement lounges are limited to viewers in the same ticket tier. For example, the social engagement module 345 may generate exclusive social engagement lounges for viewers who have purchased "court-side", "front-row", "all-access", or "VIP" level viewing rights.

In one aspect, the social engagement lounges may include one or more exclusive social network 195, as shown in FIG. 1, facilitated by the social engagement module 345. The exclusive social networks may be internally generated to facilitate communication between the limited viewers in the lounge using chat, email, video chat, or any other suitable communication modalities. Similar to a pop-up store, the exclusive social networks 195 may be unique to the eSports event and have a limited in duration, Alternatively, the social engagement module 345 may interface with external social networks (e.g. Facebook, Instagram, Twitter, etc.) to facilitate communication between the limited number of viewers in each social engagement lounge.

In one aspect, the social engagement lounges may include of viewers who are friends or acquaintances on a social network, or the lounges may join viewers who may be strangers with prior social interactions. In this regard, the social engagement module 345 may predict which group of users may have the best probability of compatibility and therefore have increased engagement with the eSports event stream. For example, the social engagement module 345 may determine that two specific viewers are friends on a social network and both enjoy cheering for opposing teams in the eSports event, and therefore generate one or more social engagement lounges that both viewers may access. In another example, the social engagement module 345 may generate social engagement lounges based on a location or the geographical proximity of multiple viewers. Alternatively, the social engagement lounges may be formed around viewers having similar interests, including but not limited to being fans of the same sport teams.

In another example, the social engagement lounge may provide a virtual "Suite" experience, where viewers purchasing these viewing rights may indulge in a virtual viewing suite offering many of the amenities available to patrons viewing a live sporting event in a physical suite at an arena or stadium. In one aspect, the social engagement module 345 may offer direct communication with third-party food and beverage providers to allow viewers to partake in an all-inclusive experience. For example, the social engagement module 345 may communicate with external each viewer's accounts at the third-party providers to allow viewers within the "Suite-level" engagement lounge to order food or beverages that may be delivered to their viewing locations. Ordering food and/or beverages may be made by individual viewers, or a group order for a plurality of lounge members may be coordinated by a single viewer or, in some instances a producer 160. The third-party services and other audio or visual enhancements may also be provided to recreate a "Pub" or "Sports bar" experience similar to the "Suite" experience.

According to one aspect, viewers may upgrade their viewing rights or ticket tier using virtual resources, in-game currency, or points, or that may be associated with a viewer user profile 310. In various aspects, the virtual resources or points may be purchased using real-world currency (e.g., U.S. dollars) in a typical online transaction. Alternatively, virtual resources may be obtained based upon a viewer's previous actions playing or otherwise engaging with the game of the eSports event. In other aspects, the virtual resources may be awarded for certain viewer actions in conjunction with other social media activities, other video game play, or even other viewer actions associated with one or more third party providers 185. The virtual resources or points may be spent in the context of the eSports event display. For example, the virtual resources may be used to purchase goods or services from the third-party providers 185 in addition to upgrading viewing rights.

In one aspect, the microtransaction module 355 determines a cost for ticket tiers or ticket tier upgrades during the eSports event based upon real time supply and demand of viewer interest. For example, starting values for each viewing tier may be established at the start of the eSports event stream. The starting values may or may not correspond to the costs of each ticket tier prior to the transmission of the event stream. In response, to a high viewer demand to access higher viewing tiers, the microtransaction module 355 may incrementally increase the cost of purchasing or upgrading viewing rights after each transaction. Conversely, the microtransaction module 355 may decrease the cost of one or viewing tiers of there is less interest or demand.

In another aspect, the microtransaction module 355 may be used to purchase one or more celebratory customizations 335. The cost of these celebratory customizations may also vary in accordance with varying demand during the eSports event.

The communication interface 350 facilitates communication between the various features of the system of FIG. 1. For example, this would facilitate transmission of information from the event server to the gaming server as well as from the gaming server to the remote viewers. The communication interface 350 also facilitates user interactions (e.g., developer, commentators) with the gaming server.

The machine learning module 360 may be an internal or external artificial intelligence (AI) or other machine learning system trained using any suitable machine learning model, system, or dataset to predict or identify likely user preferences and likely actions in the video game, among others. The machine learning module may work in conjunction with the video generation module 340 to identify existing view streams or generate new view streams that may be of interest to individual remote viewers.

Figure 4:
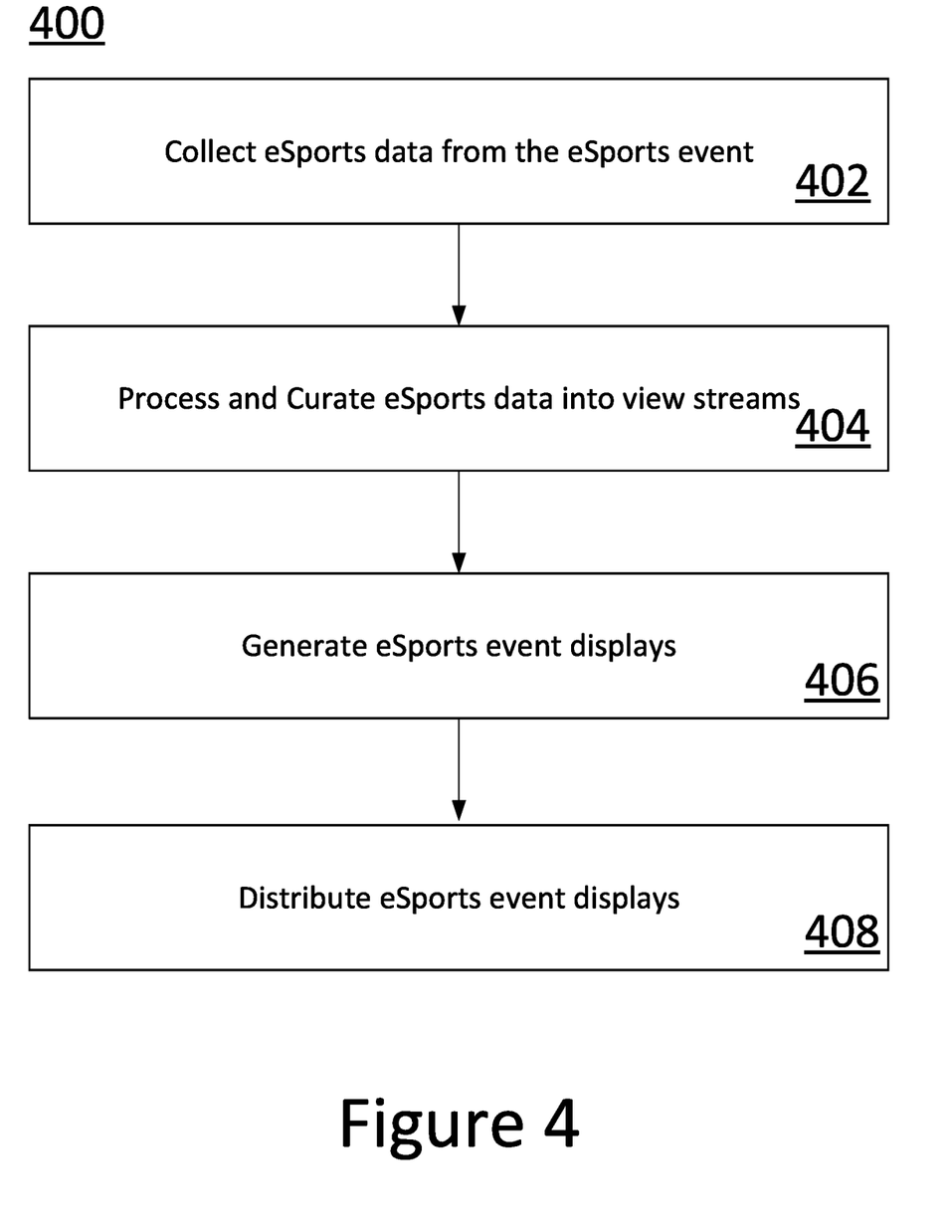
FIG. 4 is a flowchart illustrating an exemplary method for defining and customizing digital streams.

FIG. 4 is a flowchart illustrating an exemplary method 400 for dynamically defining and customizing digital streams. The remote viewer would be provided with a broadcast stream or a distribution of eSports events that has been customized for a more immersive viewer experience. The individually customized engagement and views can be tailored or made exclusive to different classes of ticket purchasers.

At step 402, eSports data is obtained from the eSports event. According to various aspects, the eSports data includes one or more video streams of an eSports event captured or produced by a producer of the eSports event. The eSports data may further include additional gameplay data generated during the event. This additional game play data may include video streams of the game taken from perspectives not ordinarily generated by the producer for the event. In one aspect, the additional gameplay data may be generated at the eSports venue or at the event server 130.

Each venue that hosts a live eSports event may have various features that facilitate in the collection of information related to the live eSports event. Cameras, microphones, and various other types of sensors can be used to obtain information about what may currently be happening with respect to the video game (e.g., each video game competitor game state, progress, statistics) as well as information about the audience attending the live eSports event (e.g., reactions such as cheers/taunts, and preferences regarding participants in the live eSports events.

In some aspects, the venue, tournament organizer, or developer that is running and managing the live eSports event may also provide specific computing devices (e.g., consoles, desktops) for each participant within the live eSports event to use for the competition. These provided computing devices may have built in functions that directly collect any and every type of information about each participant during the live eSports event.

After being collected, the eSports event data will be sent to the gaming server so that it can be processed before being distributed to remote viewers who also would like to view the eSports event. In some aspects, the eSports event data can also be stored in a database for reference later. For example, stored eSports data may be accessed by the gaming server or other third party in order to obtain and process historical information (e.g., past performance) about a particular player.

At step 404, the eSports data obtained from the eSports event is processed and curated. The processing is performed at the gaming server. The eSports event may be created, run, and managed by a tournament organizer, which in some cases may also be the developer of the video game associated with the eSports event. The tournament organizer would have gaming servers for use in processing the information coming from the eSports event that would subsequently be sent to the remote viewers on their respective user computing devices. In one aspect, the eSports data is curated into one or more video streams. The various video streams are the organized for distribution to viewers according to viewing rights associated with one or more ticket tier. In one aspect, each view stream and/or package of view streams is assigned a unique metadata identifier that is stored in the event metadata database 190.

As an example, certain video games may already track certain statistics of players associated with a video game. First person shooters may already track kills, deaths, and accuracy. In situations where the games do not track these information or there are other detailed information that viewers may be interested in viewing (e.g., response time), it would be possible to have the gaming server process the information coming from the eSports event in order to obtain this information.

Furthermore, the gaming server may have profiles for specific users (or groups of users) identifying the types of detailed information that the remote viewers may be interested in viewing. Viewers that have played the game and are invested in the competitive scene for a particular eSports event may be more likely view the detailed information compared to casual viewers who have not played the game. Furthermore, it may be possible that users can indicate what information they may want to view (and/or not want to view) specifically. In this way, the gaming server can be informed regarding what information should be associated with particular distribution of eSports event data.

At step 406, the gaming server would generate an eSports event display based on the curated eSports event data. The initial generated eSports event display may include the video recording obtained of eSports gameplay.

In some situations, the eSports event display may also involve generating a comprehensive view of what is occurring within the game using information from multiple video streams. The display may also incorporate a menu or thumbnails of other stream available in the viewers' ticket tier.

For viewers with appropriate viewing rights, the gaming server could provide different views of what the gaming environment would be (e.g., complete, team-specific) for the remote viewers using the gameplay information from multiple users.

At step 408, the eSports event data is distributed to the remote users on their respective user computing devices, in accordance with the viewing rights of the remote users. In various aspects, the gaming server 140 may automatically alter the eSports event display based upon predicted player actions, tendencies, or game scenarios.

Generally, these computing devices may include one or more displays that are used to display the eSports event data (e.g., video) for the remote viewers to view. In some aspects, the user computing device may be a computing device with an accompanying wearable headset that allows for display of virtual reality or augmented reality environments. At the very least, the eSports event data streams should be viewable using any number of different existing video players associated with the user computing device and/or public network as well.

Figure 5:
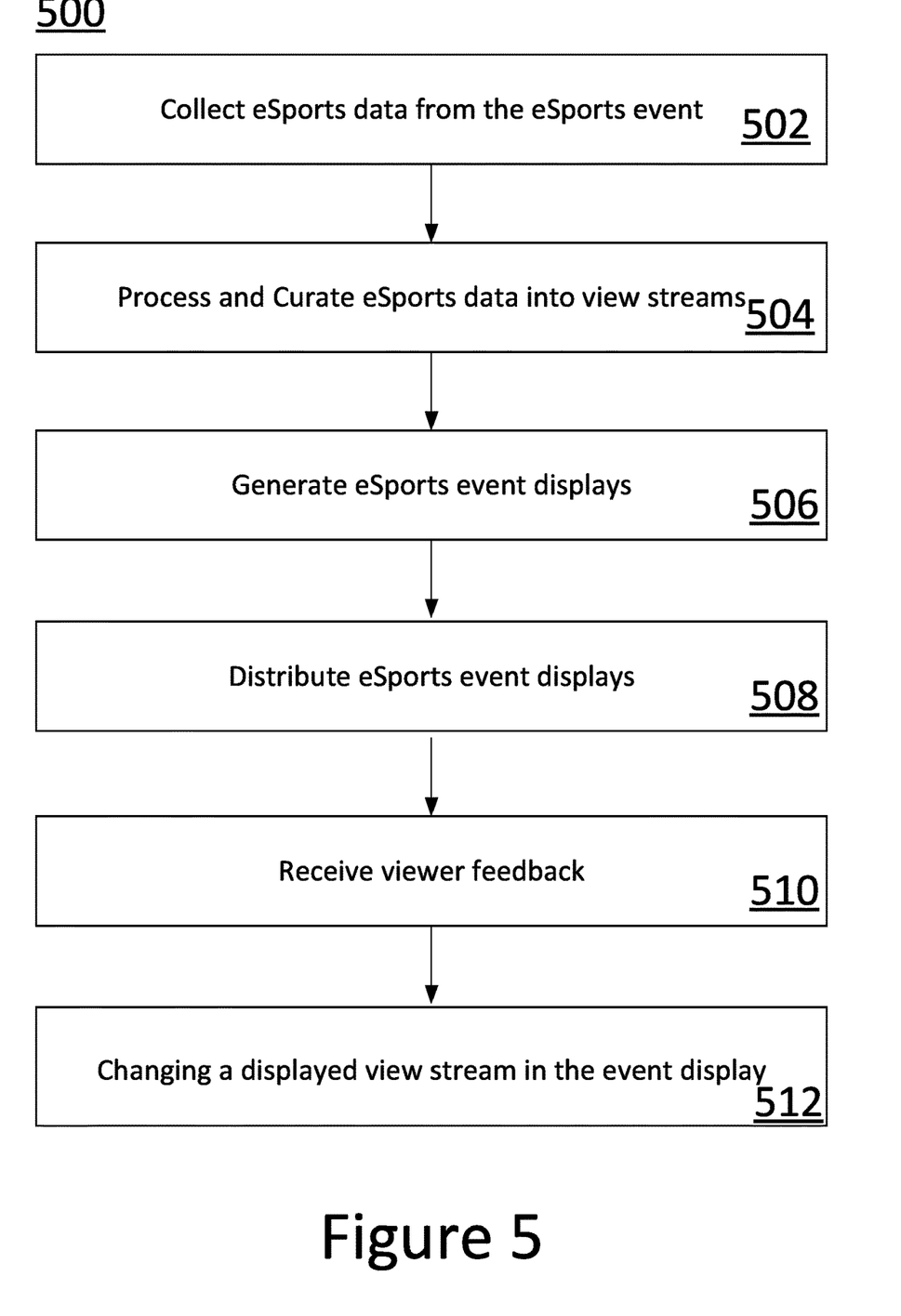
FIG. 5 is another flowchart illustrating alternative method for defining and customizing digital streams.

FIG. 5 is another flowchart illustrating an alternative method 500 for dynamically defining and customizing digital streams. In this method 500, the viewer may provide feedback that automatically dynamically alters the video data provided to the user. Similar to the method 400 described with reference to FIG. 4, step 502 of FIG. 5 illustrates that eSports data is obtained from the eSports event. At step 504, the eSports data is processed and curated into one or more view streams, while at step 506, the gaming server generates an eSports event display based on the curated eSports event data. The event displays are then distributed to the views at step 508.

During or after distribution and viewing of the eSports event display, feedback input from viewers of the eSports event displays is received at the gaming server 140 at step 510. In one aspect, the feedback input is a selection of another view perspective available within the event display according to the viewer's access or viewing rights. In another aspect, the feedback input is a rating of one or more views or perspectives in the event display. In response to the received ratings, the gaming server may suggest another view of the event display or the gaming server may automatically switch the perspective displayed to the viewer.

In yet another aspect, the feedback input is based on a physical motion of the viewer captured by the viewers computing device. The physical motion may include a viewer's eye motions or facial expression, among others. In response to the received ratings, the gaming server may automatically display or suggest another perspective view of event display at step 512.

Further modification may include changing a point of view. Point of view can be selected to provide the best view of the most interesting event(s) occurring within the eSports event. For example, preferences can be established (for example by the user who would like to follow a particular player) beforehand that allows specific point of view to be used whenever a particular player of interest (or group of players) is participating within the eSports event. The gaming server can monitor the status of the eSports event and switch views within the game whenever that particular player appears on the stream or engages with players of the opposing team. Perspective changes may include changing the camera angle within the game, providing that player's point of view using that player's game data, or providing another player's point of view that includes that player of interest.

In various aspects, the steps 510 and 512 may be repeated throughout the viewing of the event display. As such, each viewer may be provided with an individually customized viewing experience during the eSports event.

Figure 6:
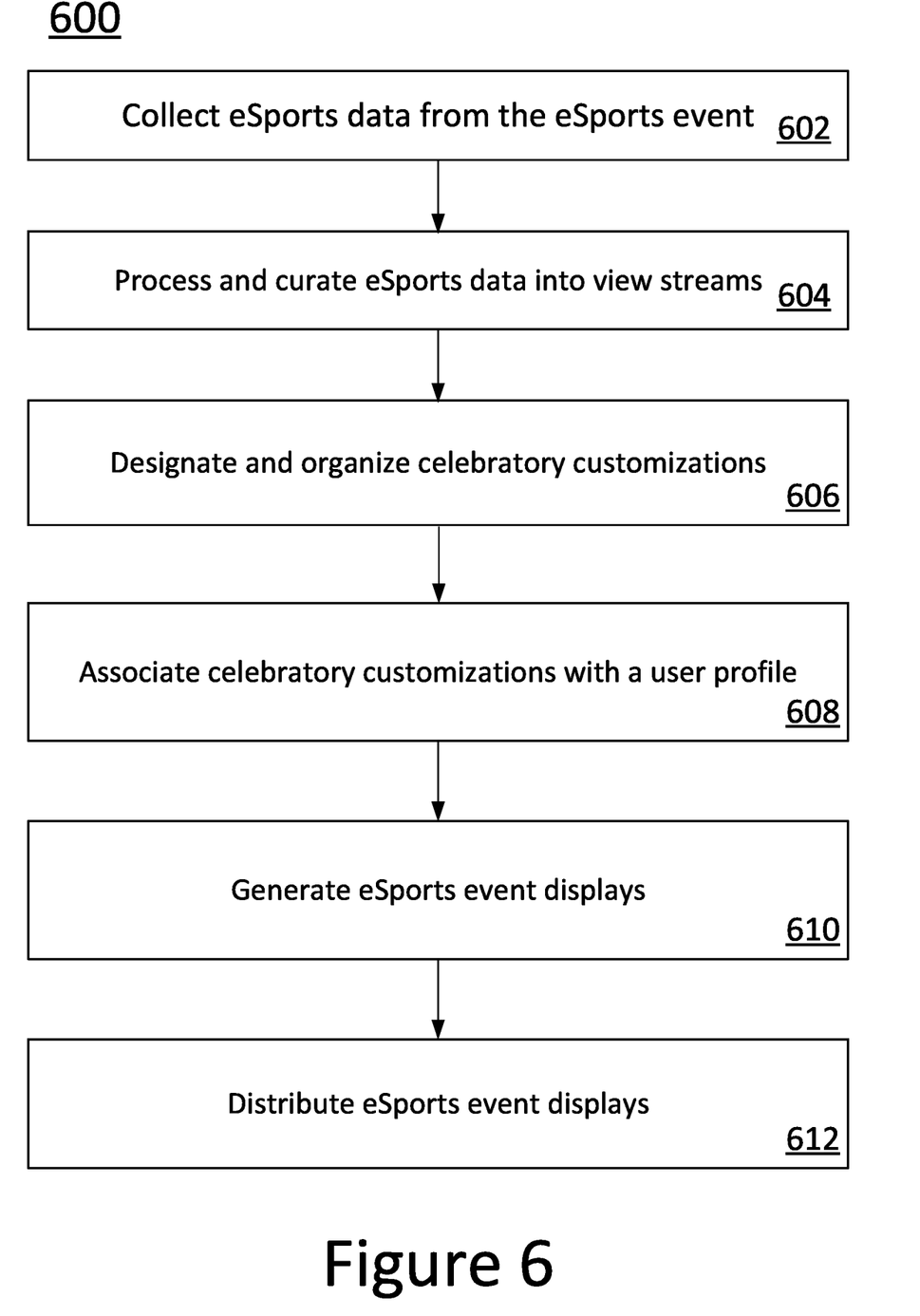
FIG. 6 is a flowchart illustrating an exemplary method for defining and individually customizing digital streams.
Figure 7:
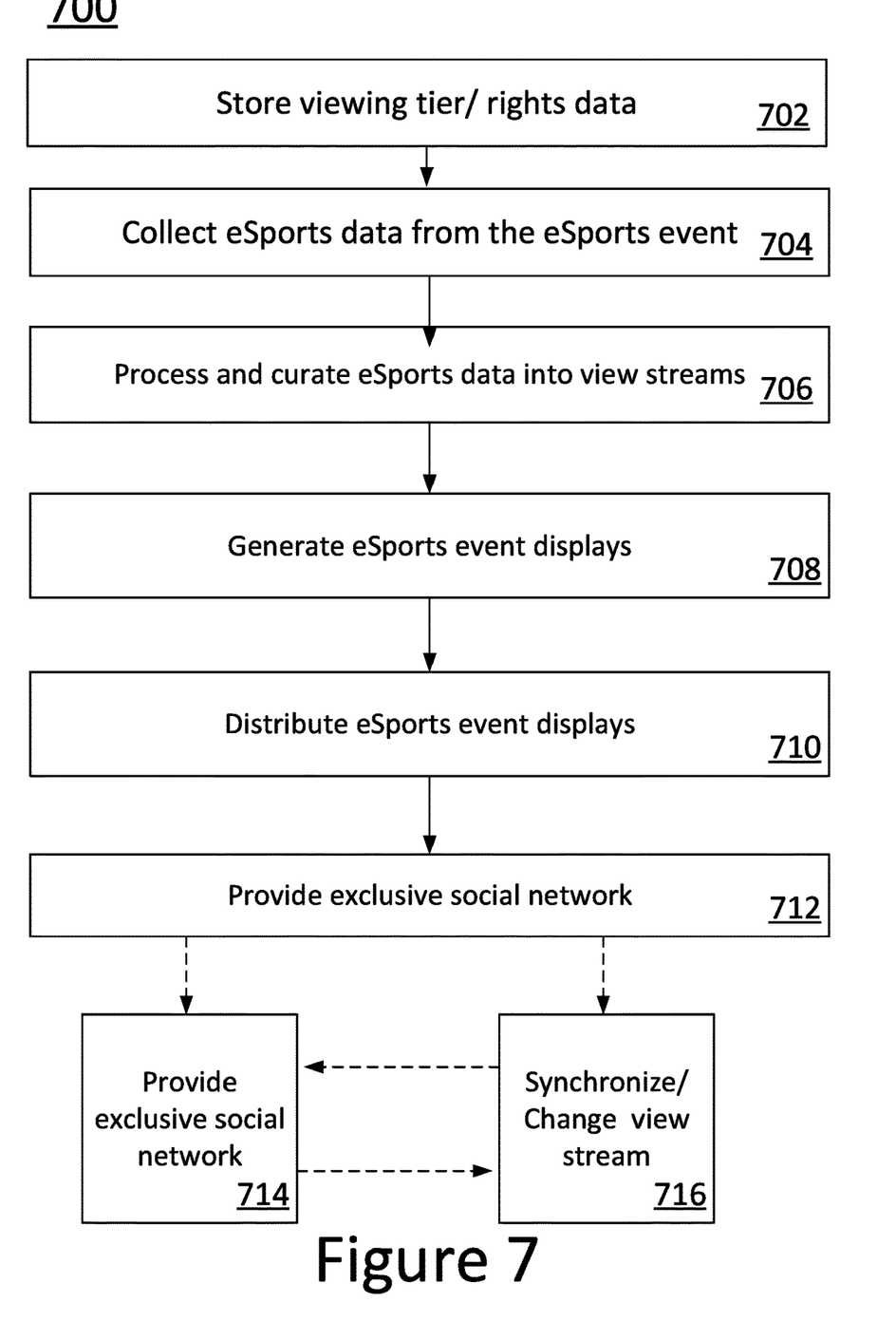
FIG. 7 is another flowchart illustrating alternative method for customizing digital streams and enhancing social engagement.

Additional methods to provide individual stream customizations are illustrated in flowcharts of FIGS. 6 and 7. In various aspects, the methods for obtaining, curating or organizing, generating and distributing the customized streams may be similar to those described regarding methods 400 and 500.

Referring now to FIG. 6 is a flow chart is a flowchart illustrating an exemplary method 600 for defining and customizing individual digital streams. The remote viewer would be provided with a broadcast stream or a distribution of eSports events that has been customized for a more immersive viewer experience. The number of individual stream customizations can be tailored or made exclusive to different classes of ticket purchasers.

In one aspect, at step 602, eSports data is obtained from the eSports event. According to various aspects, the eSports data includes one or more video streams of an eSports event captured or produced by a producer of the eSports event. The eSports data may further include additional gameplay data generated during the event. This additional game play data may include video streams of the game taken from perspectives not ordinarily generated by the producer for the event. In one aspect, the additional gameplay data may be generated at the eSports venue or at the event server 130.

After being collected, the eSports event data will be sent to the gaming server so that it can be processed before being distributed to remote viewers who also would like to view the eSports event. In some aspects, the eSports event data can also be stored in a database for reference later. For example, stored eSports data may be accessed by the gaming server or other third party in order to obtain and process historical information (e.g., past performance) about a particular player.

At step 604, the eSports data obtained from the eSports event is processed and curated. The processing is performed at the gaming server.

At step 606, one or more video game asset may be designated as a celebratory customization 335. These video game assets may then be organized and stored in a database, such as the video stream database 180, by the gaming server 140. In one aspect, celebratory customizations 335 are also associated with metadata stored in the metadata database 190 as an additional means to recall and retrieve the celebratory customizations 335. The celebratory customizations 335 may be further associated with a user profile related to a user computing device 120 at step 608

At step 610, the gaming server generates an eSports event display based on the curated eSports event data. The gaming server incorporates and/or synchronizes the celebratory customizations with one or more events streams for viewers or spectators who have purchased or otherwise have access to customized streams that include celebratory customizations 335, as indicated by corresponding user profiles. In another aspect, the celebratory customization 335 may replace an existing video game asset in one or more event stream.

At step 612, the eSports event data is distributed to the remote users on their respective user computing devices, in accordance with the spectators viewing rights or access to individually customized streams.

Another example method 700 to provide individual stream customizations is illustrated as a flowchart in FIG. 7. This method 700 further engages viewers with the eSports event by providing viewers with a more immersive and social environment to view the event, At step 702, information regarding the various viewing tiers, and the viewing rights associated with each tier are stored by the gaming server 140. The viewing tier data may be correlated or assigned to spectators in accordance with the viewing rights purchased or otherwise accessible to each remote viewer. At step 704, eSports data is obtained from the eSports event. The eSports data obtained from the eSports event is processed and curated at the gaming server at step 706.

The gaming server generates an eSports event display based on the curated eSports event data, at step 708. In various aspects, the generated eSports event display may include one or more celebratory customizations 335, in accordance with the viewing rights of the viewers, if applicable.

At step 710, the eSports event data is distributed to the remote users on their respective user computing devices. In accordance with the spectators viewing rights or access to individually customized streams, the distributed event stream may be customized for each individual viewer.

At step 712, viewer engagement may be further enhanced by providing the spectator device access to an exclusive social network 195 based on data in the user profile. In one aspect, the exclusive social networks are exclusive and limited to the viewers in particular viewing tiers. In one aspect, each viewing tier may have access to its own social network. In another aspect, the exclusive social network may limited to viewers based upon the viewers' geographic location. In yet another aspect, the exclusive social network may be limited to viewers based upon their support or allegiance to a particular eSports team, player, or video game.

In various aspects, additional steps 714 and/or 716 may be performed to enhance social engagement within the exclusive social network 195 further. These additional steps may include providing access to third-party services for viewers within the exclusive social network at step 714 or synchronizing and/or changing the view stream for all viewers in the exclusive social network simultaneously. Additionally, to promote exclusivity of the social network for viewers further, real-time or near real-time microtransactions may be offered to remote viewers seeking access to a limited-capacity exclusive social network 195.

The foregoing detailed description of the technology herein has been presented for purposes of illustration and description. It is not intended to be exhaustive or to limit the technology to the precise form disclosed. Many modifications and variations are possible in light of the above teaching. The described aspects were chosen in order to best explain the principles of the technology and its practical application to thereby enable others skilled in the art to best utilize the technology in various aspects and with various modifications as are suited to the particular use contemplated. It is intended that the scope of the technology be defined by the claim.

What is claimed is:

1. A method for providing individual customizations of a stream for an eSports event, the method comprising:
    collecting information regarding the eSports event from an event server, wherein the information includes view data and gameplay information of the eSports event, wherein the view data includes a plurality of player perspectives generated from a venue of the eSports event;
    generating metadata associated with the view data, wherein the collected information is organized based on unique identification assigned to the generated metadata, wherein at least one view of the eSports event is based on the view data and gameplay information;
    storing information regarding spectator preferences;
    generating a customized stream for a spectator device based on the collected information from the eSports event, wherein the customized stream is based on the spectator preferences that includes a selection of one or more players, wherein the customized stream is a composite of two or more view data based on the generated metadata;
    automatically altering the customized stream based on predicted actions of the selection of one or more players, wherein the altered customized stream is assigned a new unique identifier, the new unique identifier provided to a learning model for predicted actions; and
    distributing the altered stream to the spectator device over a communication network.

2. The method of claim 1, wherein generating the customized stream is based on a player preference received from the spectator device.

3. The method of claim 1, wherein generating the customized stream includes switching views when the one or more selected players engages one or more opposing players.

4. The method of claim 1, wherein altering the customized stream is based on historical information of the one or more players.

5. The method of claim 1, wherein altering the customized stream is further based on game scenarios.

6. The method of claim 1, wherein altering the customized stream includes changing a camera angle within a game engaged by the one or more players.

7. The method of claim 1, wherein the customized stream includes one or more selected perspectives of the one or more players.

8. The method of claim 7, wherein the selected perspectives are different from a point-of-view selected by the one or more players.

9. The method of claim 1, wherein generating the customized stream further includes incorporating one or more celebratory customization into the stream.

10. The method of claim 9, wherein the celebratory customization highlights actions detrimental to an opposing team of the one or more players.

11. A system for providing individual customizations of a stream for an eSports event, the system comprising:
  a database that stores spectator preferences;
  an event server that collects information from an eSports event, wherein the information includes view data and video gameplay information; and
  a gaming server that:
    generates metadata associated with the view data, wherein the collected information is organized based on unique identification assigned to the generated metadata, wherein at least one view of the eSports event is based on the view data and gameplay information, wherein the view data includes a plurality of player perspectives generated from a venue of the eSports event;
    generates a customized stream for a spectator device based on the collected information from the eSports event, wherein the customized stream is based on the spectator preferences that includes a selection of one or more players, wherein the customized is a composite of two or more view data based on the generated metadata;
    automatically alters the customized stream based on predicted actions of the selection of one or more players, wherein the altered customized stream is assigned a new unique identifier, the new unique identifier provided to a learning model for predicted actions; and
    distributes the altered stream to the spectator device over a communication network.

12. A non-transitory computer-readable storage medium having embodied thereon a program, the program being executable by a processor to perform a method for providing individual customizations of a stream for an eSports event, the method comprising:
  storing information regarding a one or more spectator preferences;
  collecting information regarding the eSports event from an event server, wherein the information includes view data and gameplay information of the eSports event, wherein the view data includes a plurality of player perspectives generated from a venue of the eSports event;
  generating metadata associated with the view data, wherein the collected information is organized based on unique identification assigned to the generated metadata, wherein at least one view of the eSports event is based on the view data and gameplay information;
  generating a customized stream for a spectator device based on the collected information from the eSports event, wherein the customized stream is based on the spectator preferences that includes a selection of one or more players, wherein the customized stream is a composite of two or more view data based on the generated metadata;
  automatically altering the customized stream based on predicted actions of the selection of one or more players, wherein the altered customized stream is assigned a new unique identifier, the new unique identifier provided to a learning model for predicted actions; and
  distributing the altered stream to the spectator device over a communication network.

* * * * *